E. R. SMITH.
MEAT CUTTING MACHINE.
APPLICATION FILED SEPT. 10, 1909.
997,017.
Patented July 4, 1911.
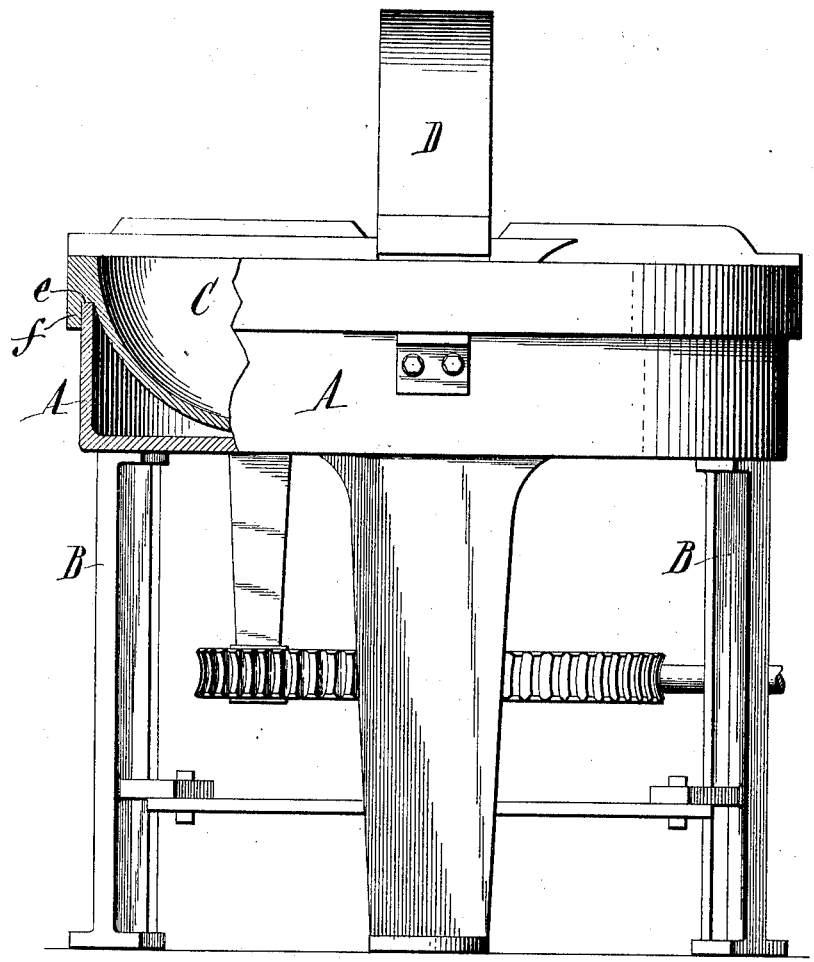

UNITED STATES PATENT OFFICE.

EDWIN R. SMITH, OF BUFFALO, NEW YORK.

MEAT-CUTTING MACHINE.

997,017.  Specification of Letters Patent.  Patented July 4, 1911.

Application filed September 10, 1909. Serial No. 517,001.

*To all whom it may concern:*

Be it known that I, EDWIN R. SMITH, a citizen of the United States, residing at Buffalo, in the county of Erie and State of New York, have invented a new and useful Improvement in Meat-Cutting Machines, of which the following is a specification.

This invention relates to meat cutting machines of the class comprising a circular frame or bed-ring supported upon legs or standards, a rotary bowl arranged within the ring and rotary knives or cutters mounted upon a shaft extending across the bowl.

The object of my invention is to improve the construction of the machine with a view of effectually preventing the entrance of meat, water, &c., between the bowl and the bed-ring and underneath the bowl, thereby rendering the machine clean and sanitary.

The accompanying drawing is a side elevation, partly in section, of a meat cutter embodying the invention.

A indicates the bed-ring or stationary circular frame supported by the usual legs B; C the rotatable bowl arranged within the bed-ring, and D the inclosing hood of the customary rotary knives or cutters which are not shown in the drawing, as they form no part of the invention. The driving mechanism of the bowl is also not fully shown for the same reason. It may be of any suitable or well known construction.

As shown in the drawing, the bowl preferably has the usual concavo-convex form and is provided on the underside of its rim with a horizontal shoulder *e* resting upon or arranged in close proximity to the upper edge of the bed-ring A. On the outer side of this shoulder the bowl is provided with a depending annular flange *f* which overlaps the outer side of the bed-ring, the flange extending a suitable distance below the upper edge of the bed-ring to form a guard or shield. This flange or shield prevents any water or fragments of meat which may escape over the edge of the bowl from entering between the bowl and the bed-ring and lodging underneath the bowl or other inaccessible place. Befouling of the machine which would be liable to result from such entrance and lodgment of the meat and water is thus obviated, enabling all parts of the machine to be kept clean and sanitary. In addition to this sanitary function, the flange also causes the bowl to run more evenly and steadily and reduces wear between the same and the bed-ring A. As shown in the drawing, this flange is cast integrally with the bowl, but it could obviously be made separate therefrom and riveted or otherwise secured thereto.

I claim as my invention:

1. In a meat cutting machine, the combination of a rotary bowl and a relatively fixed bed-ring surrounding the bowl and extending upwardly from a point opposite the bottom thereof, the bowl being provided with a depending marginal guard-flange which overlaps the outer side of the bed-ring.

2. In a meat cutting machine, the combination of a rotary bowl, and a surrounding relatively fixed bed-ring extending upwardly from a point opposite the bottom of the bowl and terminating short of its upper edge, the bowl being provided with an annular horizontal shoulder arranged in close proximity to the top of the bed-ring and extending to the outer side thereof, and at the outer edge of said shoulder with a depending guard-flange which overlaps the outer side of the bed-ring.

Witness my hand this 31st day of August, 1909.

EDWIN R. SMITH.

Witnesses:
C. F. GEYER,
E. M. GRAHAM.

---

Copies of this patent may be obtained for five cents each, by addressing the "Commissioner of Patents, Washington, D. C."